Dec. 7, 1926.
A. MOORHOUSE
1,609,526
GOVERNOR FOR HYDROCARBON MOTORS
Filed June 9, 1920
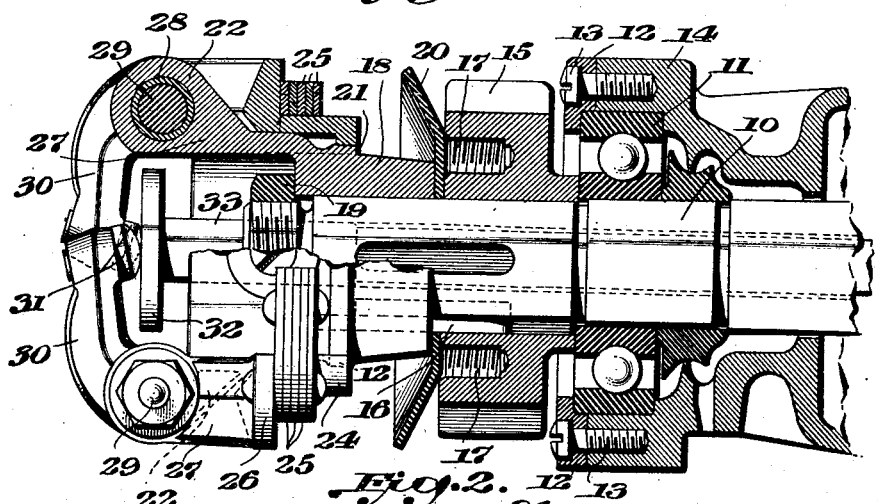
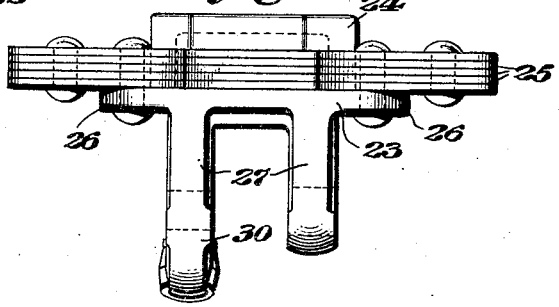
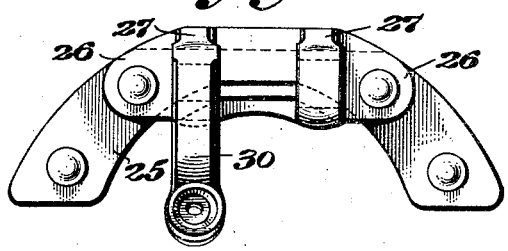
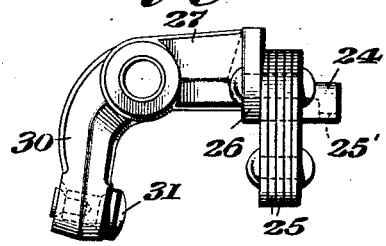
Inventor,
Alfred Moorhouse,
By Milton Tibbetts
Atty.

Patented Dec. 7, 1926.

1,609,526

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

GOVERNOR FOR HYDROCARBON MOTORS.

Application filed June 9, 1920. Serial No. 387,703.

This invention relates to hydrocarbon motors, and more particularly to governor mechanism therefor.

It is customary with commercial motor vehicles to provide means for throttling the motor at a maximum speed and this speed varies with different types of motor trucks.

It is desirable, for instance, with pneumatic tired trucks to operate them at higher speeds than the ordinary solid tire trucks. If the same motor be used on vehicles which have different speed limits, it will therefore, be clear that different governor mechanisms must be used.

This invention has for its object to provide a governor capable of adaptation for use on trucks to be run at different maximum motor speeds.

Another object of the invention is to provide a governor that will operate quickly in throttling the motor after coming into action.

Another object of the invention is to provide a construction that may be easily and quickly changed from a high speed to a low speed governor or vice versa.

Another object of the invention is to provide a governor construction that may be cheaply manufactured.

Further objects will appear from the following specification taken in connection with the drawings which form a part of this application, and in which:

Figure 1 illustrates the governor mechanism in longitudinal section;

Figure 2 is a plan view of the governor weight supporting bracket with the weights thereon;

Figure 3 is an elevational view taken at right angles to Figure 2; and

Figure 4 is a view in elevation taken at right angles to Figure 3.

In the particular embodiment of the invention illustrated the objects are accomplished by providing a governor weight arm or bracket with means whereby the weights may be varied for different conditions of use without utilizing different sizes or types of brackets.

Referring to the drawings, I have shown the governor mechanism as carried by governor shaft 10, which is supported in suitable bearings 11, which are in this instance shown as ball bearings, secured by means of a clamping ring 12 and screws 13 to a frame 14, which, in turn, is mounted on the crank case of the motor.

Shaft 10 is positively driven by means of a gear 15 keyed to the shaft as shown at 16 and connected by suitable gearing to the crank shaft. A plurality of screw threaded openings 17 are formed in the outer face of the gear 15 to facilitate the removal of this gear from the shaft.

The main supporting member for the governor mechanism comprises a sleeve member 18, mounted on the outer end of the shaft 10 and secured thereon by means of a nut 19, which is threaded on the end of the shaft, a disk member or washer 20 being interposed between the sleeve member 18 and the gear 15 for the purpose of preventing injury to the gear by the breakage of any of the rotating parts of the governor. The sleeve member 18 has formed thereon a cylindrical portion 21, which forms a stop for the governor weight brackets, in a manner hereinafter described, and has also formed thereon a pair of outwardly extending lugs 22, the latter being positioned diametrically opposite each other.

The governor members comprising weight arms or brackets 23 are illustrated in detail in Figures 2 to 4, and are L-shaped in elevation, or in other words take the form of bell crank levers. Each of these brackets is provided with a weight positioning and supporting portion 24 adjacent one end thereof, this portion being curved in section to conform to the curvature of the weights. Each of the weight supporting portions 24 has formed thereon adjacent its free end an offset flange 25', which is adapted to engage the cylindrical portion 21 of the sleeve member 18 when the governor weights are at rest. Each of the portions 24 forms the ledge upon which the governor weights 25 are supported, these weights being built up of separate laminated strips preferably of sheet metal, arcuate in form as shown in Figure 3, these laminated strips being riveted to web portions 26 of the brackets 23, as clearly shown in Figures 2 to 4.

The laminated strips 25 are made arcuate in outline in order to bring the center of gravity of the weight inwardly toward the center of the rotating governor shaft, since it is desirable to have the center of gravity positioned close to the shaft in order to provide a governor which will permit a maximum motor speeed before coming into action, and will quickly throttle the motor after it comes into action, due to the rapid increase in the moment of the governor weights.

Each of the brackets 23 has formed thereon intermediate its ends a pair of arms 27 which are pivoted to the lugs 22 formed on the sleeve member 18, bushings 28 being positioned between the pivot bolts 29 and the brackets.

One of the arms on each bracket is extended beyond the pivot to form a throttle control portion 30, these extensions having formed thereon or secured to their free ends suitable studs 31, which engage a head 32 formed on the outer end of a rod 33, which is longitudinally slidable in the governor shaft 10 and is connected at its opposite end in some suitable manner to the throttle valve of the motor. It will be understood that the extensions 30 on the respective brackets are offset with respect to each other, and are positioned side by side at their free ends as they engage the head 32.

In the operation of the device as the motor is speeded up and the shaft 10 rotates, the governor weights 25 will gradually be swung outward by centrifugal force causing the brackets 23 to swing about their pivots 29, thus forcing the extensions 30 against the head 32 carried by the rod 33. This action causes the rod to be forced in, thereby closing the throttle valve and decreasing the speed of the motor. If the governor mechanism as described is to be used on a vehicle to be run at a different speed and by the same motor it will be evident that the weights should be changed, and in order to do this it is merely necessary to either decrease or increase the number of laminated strips mounted on the brackets.

From the above description it will be seen that a simple and practical construction of governor mechanism has been provided, and moreover a construction which will readily adapt itself for use on vehicles to be operated under different conditions, and also that the construction described may be economically manufactured.

Although one specific embodiment of the invention has been illustrated and described, it should be understood that the invention is not limited to the particular construction described, but that changes and modifications may be made without departing from the spirit or scope of the invention as expressed in the following claim.

Having thus described my invention, what I claim and desire to secure by Letters Patent is:

A governor comprising a rotating member, an L-shaped weight supporting bracket formed with a ledge at its free end and the other end of said bracket being adapted to engage a throttle controlled member, and a plurality of weights positioned on said ledge and secured to said governor bracket.

In testimony whereof I affix my signature.

ALFRED MOORHOUSE.